(No Model.) 10 Sheets—Sheet 1.

L. P. SHERMAN.
MACHINE FOR DRAWING IN WARP THREADS.

No. 592,667. Patented Oct. 26, 1897.

Witnesses:
Hamilton D. Turner
Charles De Cou

Inventor:
Lewis P. Sherman
by his Attorneys
Howson & Howson (No Model.)

10 Sheets—Sheet 4.

L. P. SHERMAN.
MACHINE FOR DRAWING IN WARP THREADS.

No. 592,667. Patented Oct. 26, 1897.

Witnesses:
Hamilton D. Turner
Charles DeCou

Inventor:
Lewis P. Sherman
by his Attorneys
Howson & Howson (No Model.) 10 Sheets—Sheet 5.
L. P. SHERMAN.
MACHINE FOR DRAWING IN WARP THREADS.
No. 592,667. Patented Oct. 26, 1897.
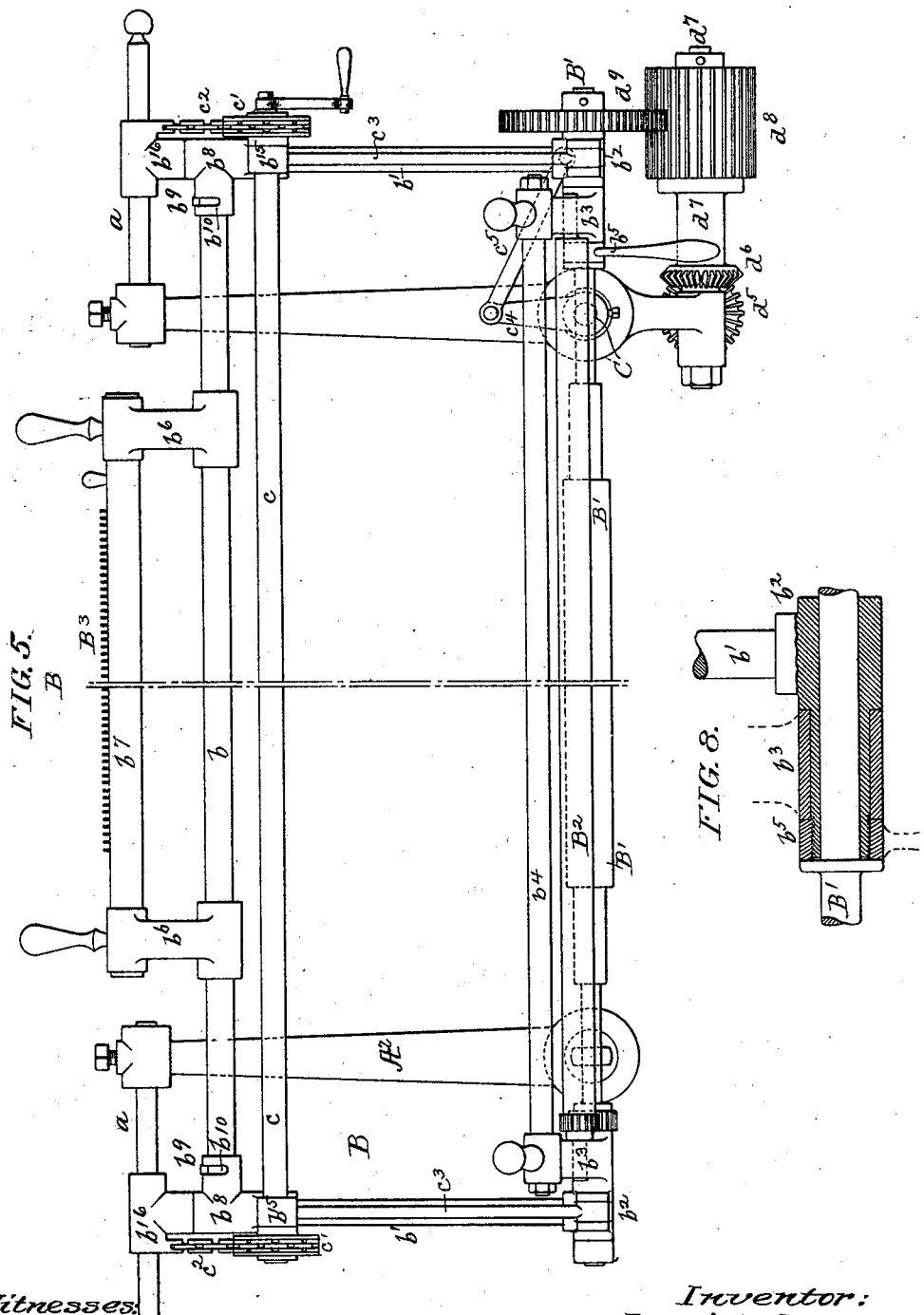
Witnesses:
Inventor:
Lewis P. Sherman
by his Attorneys
Howson & Howson (No Model.) 10 Sheets—Sheet 6.
L. P. SHERMAN.
MACHINE FOR DRAWING IN WARP THREADS.
No. 592,667. Patented Oct. 26, 1897.
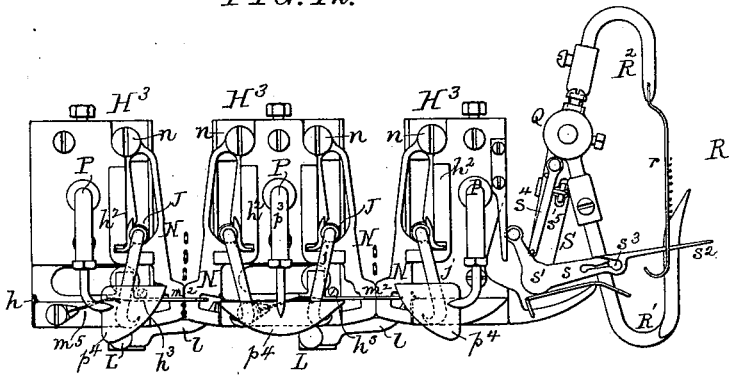
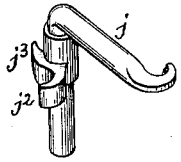
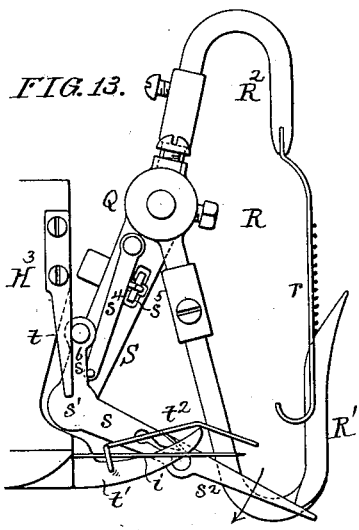
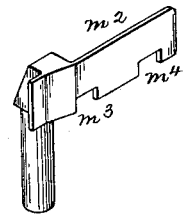
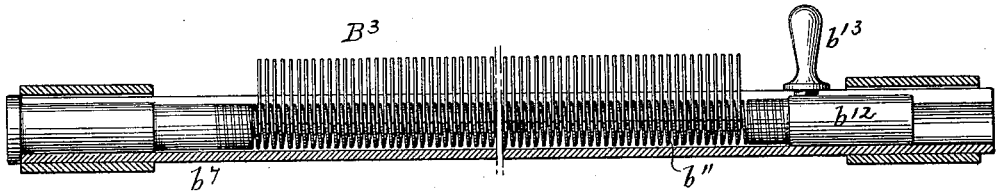
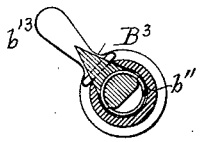
Witnesses:
Hamilton D. Turner
Charles DeBow
Inventor:
Lewis P. Sherman
by his Attorneys
Howson & Howson

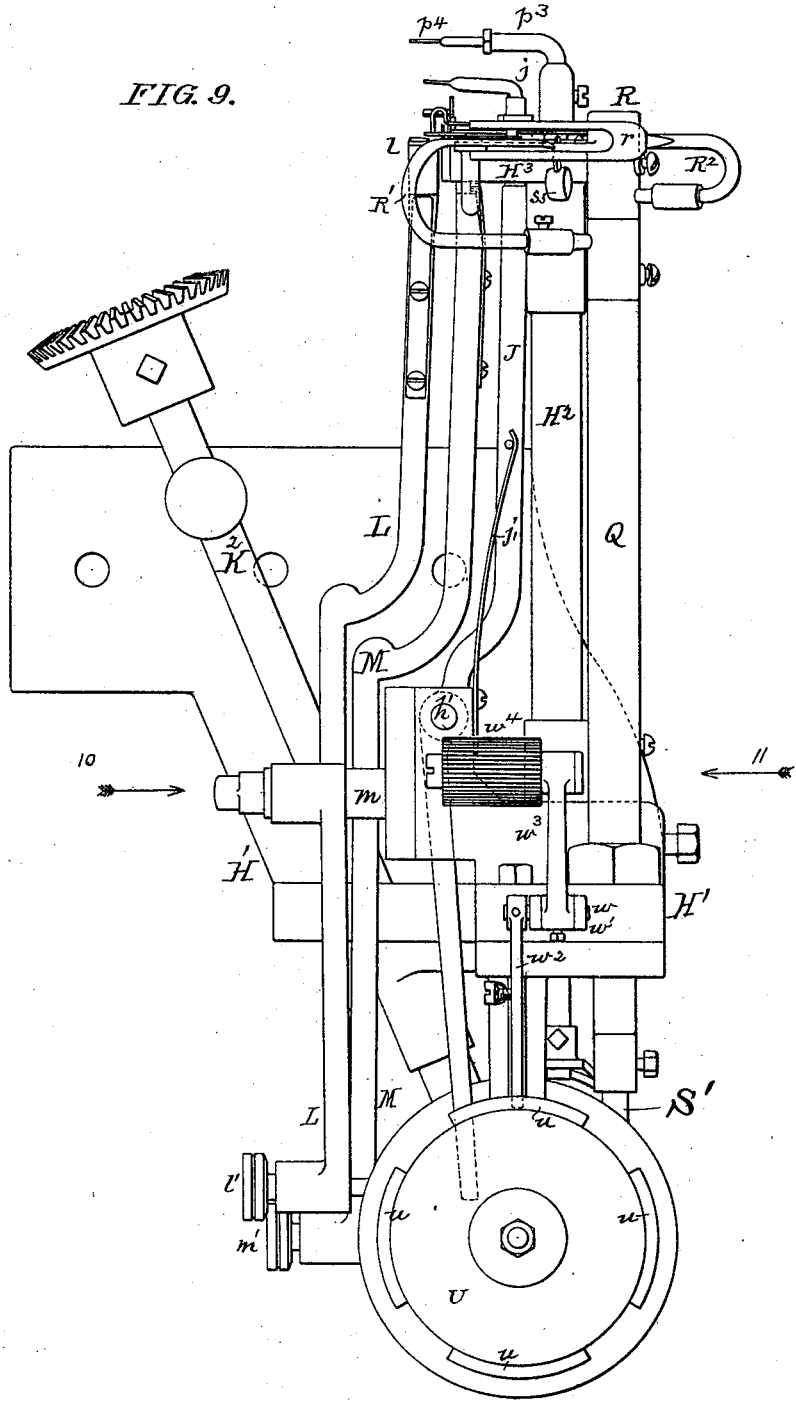

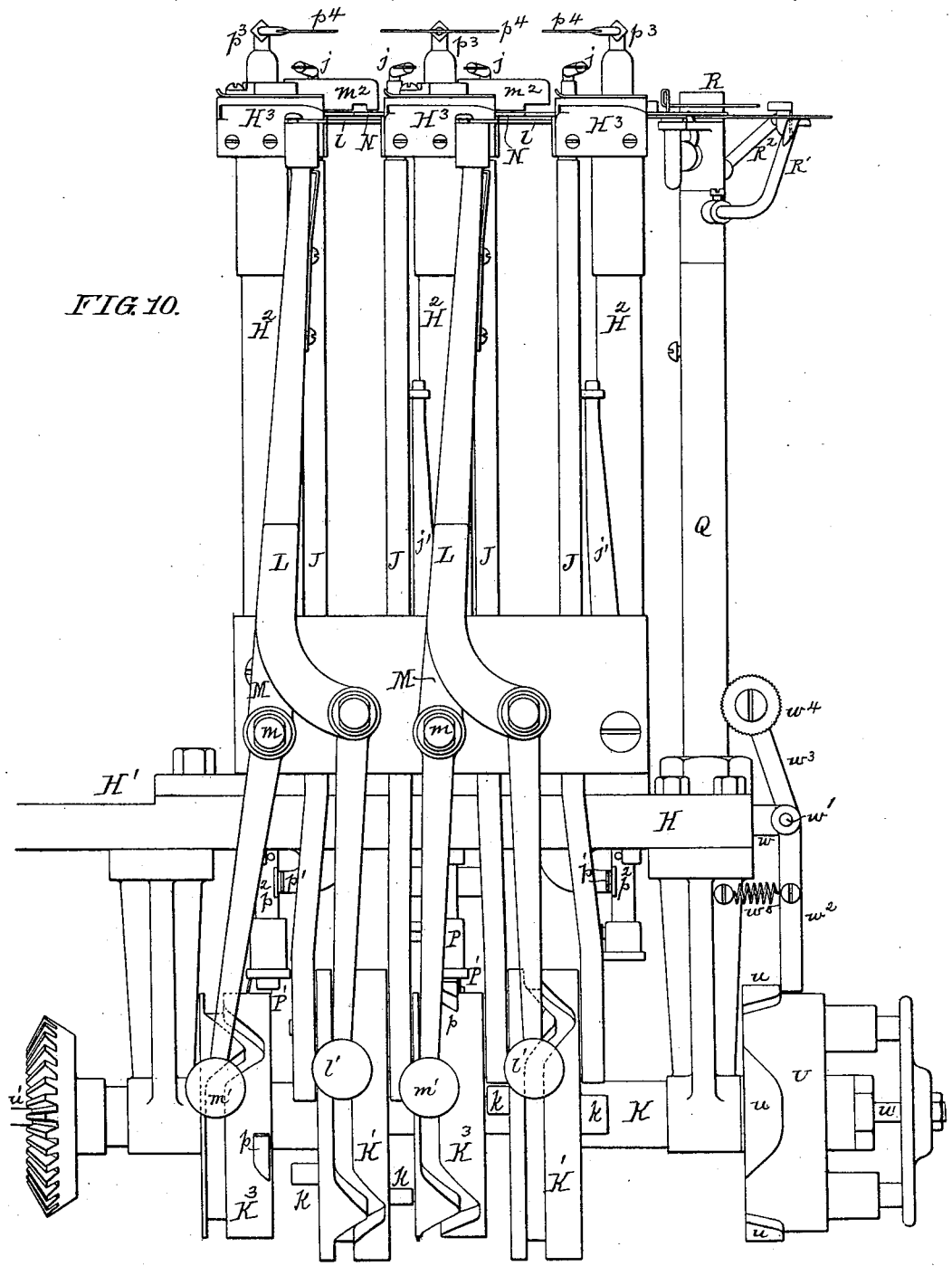

(No Model.) 10 Sheets—Sheet 10.

L. P. SHERMAN.
MACHINE FOR DRAWING IN WARP THREADS.

No. 592,667. Patented Oct. 26, 1897.

UNITED STATES PATENT OFFICE.

LEWIS P. SHERMAN, OF BIDDEFORD, MAINE, ASSIGNOR TO GEORGE MOORE, OF BERWICK, MAINE.

MACHINE FOR DRAWING IN WARP-THREADS.

SPECIFICATION forming part of Letters Patent No. 592,667, dated October 26, 1897.

Application filed December 9, 1895. Serial No. 571,572. (No model.)

*To all whom it may concern:*

Be it known that I, LEWIS P. SHERMAN, a citizen of the United States, and a resident of Biddeford, Maine, have invented certain Improvements in Machines for Drawing in Warp-Threads, of which the following is a specification.

My invention relates to certain improvements in machines for drawing warp-threads through the heddles and reeds.

The object of my present invention is to simplify the construction of certain parts of the machine, notably the heddle-eye-selecting devices, the thread-selector, and the thread-carrier. This object I attain in the following manner, reference being had to the accompanying drawings, in which—

Figure 1:
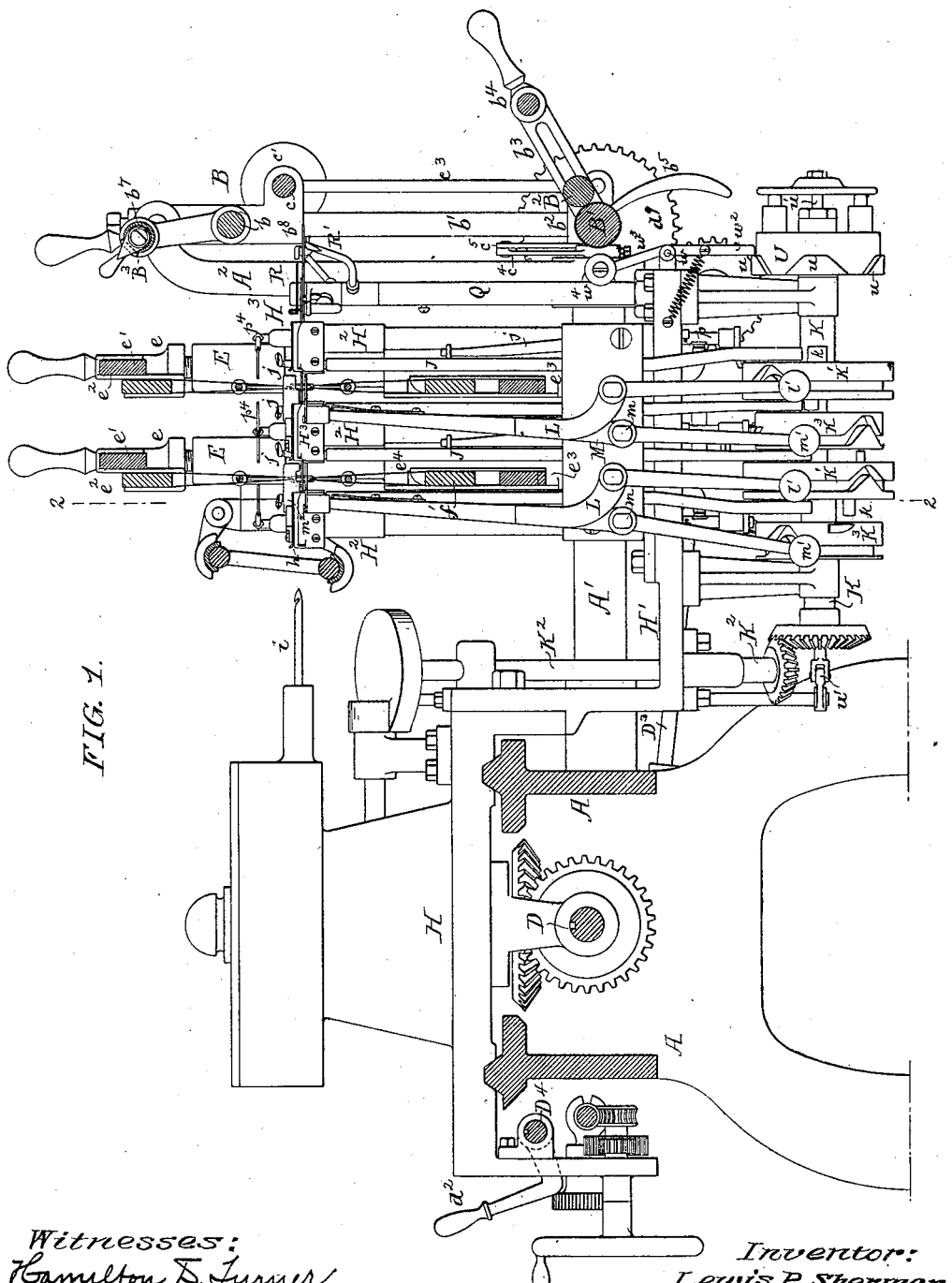
Figure 2:
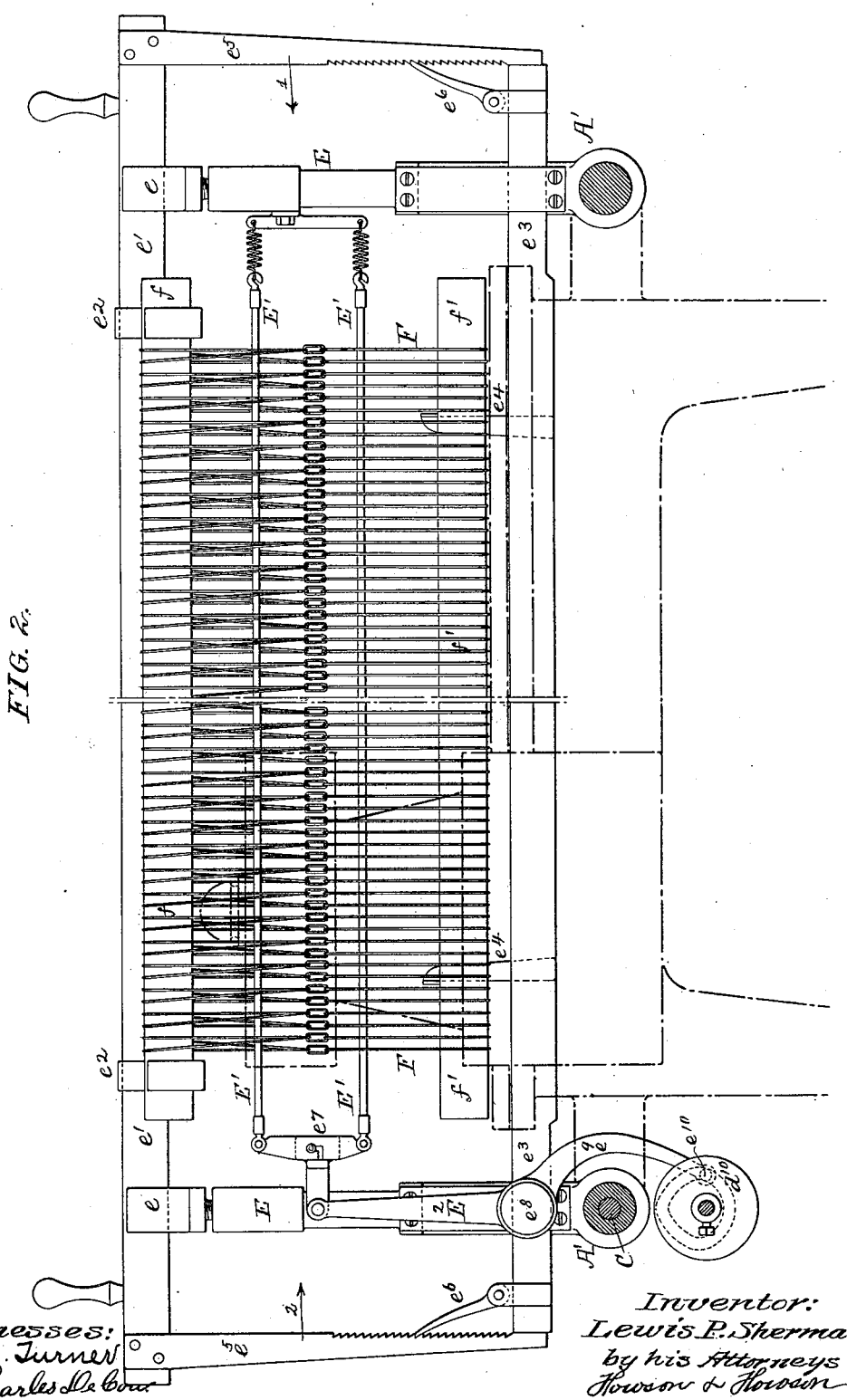
Figure 3:
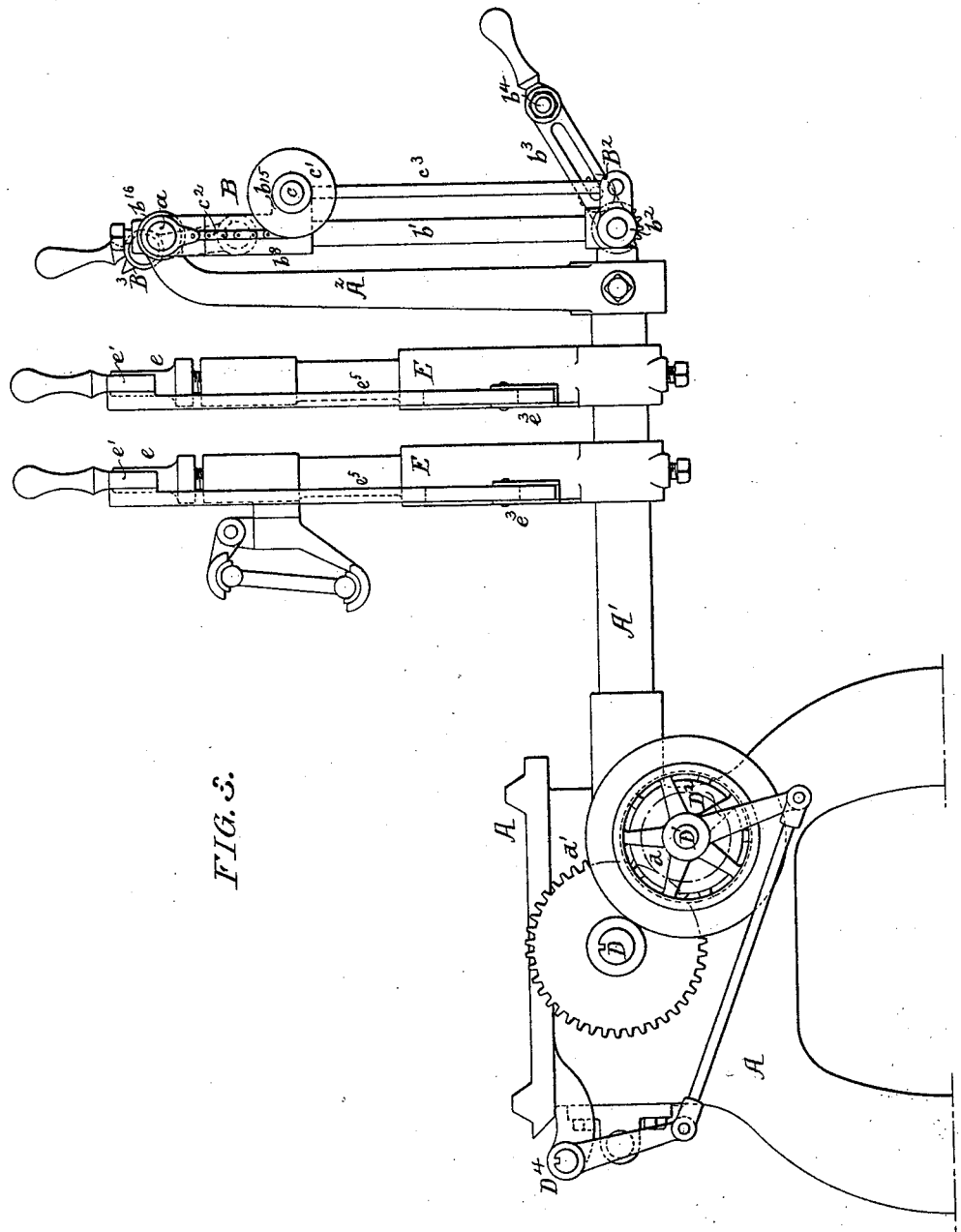
Figure 4:
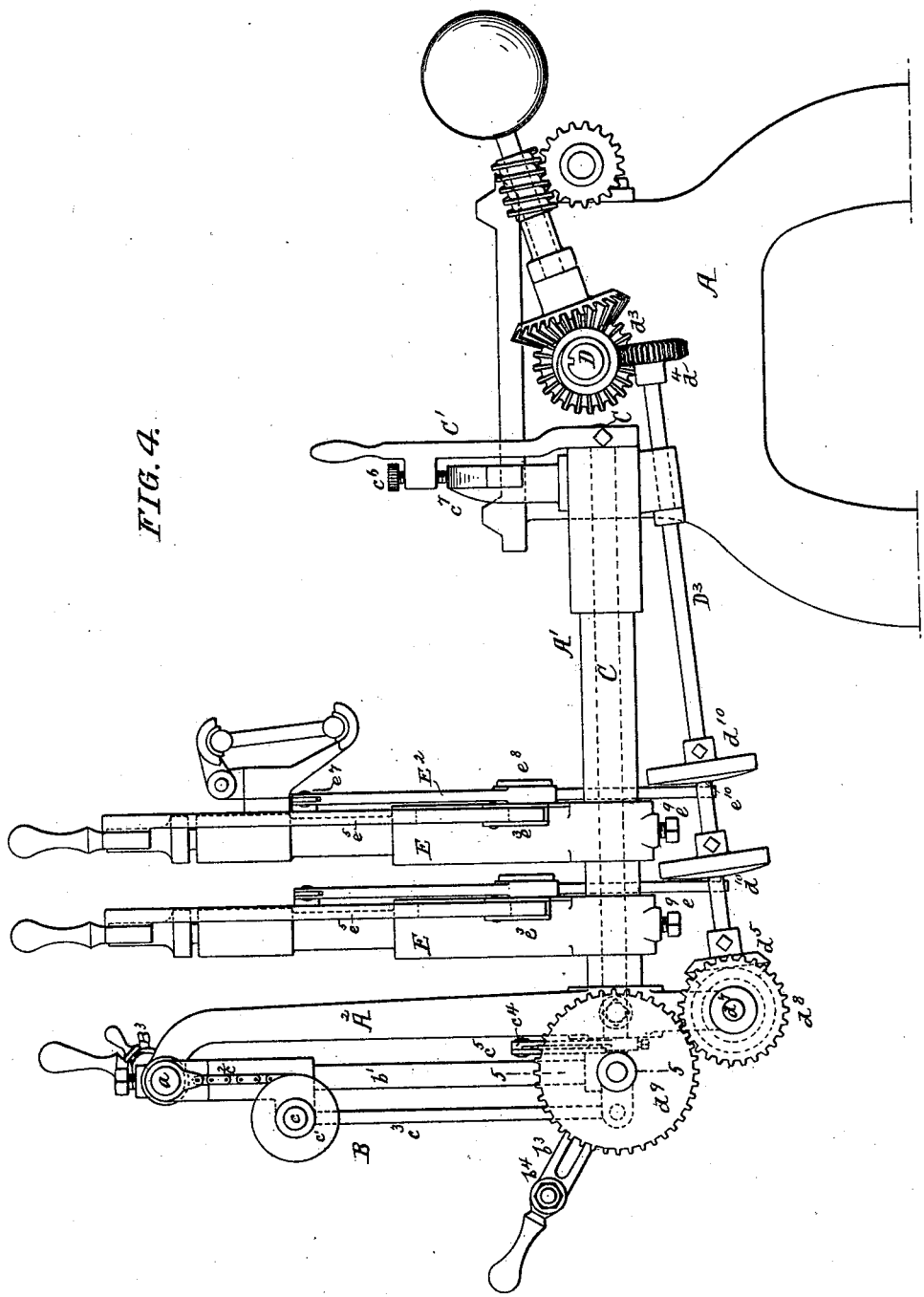
Figure 11:
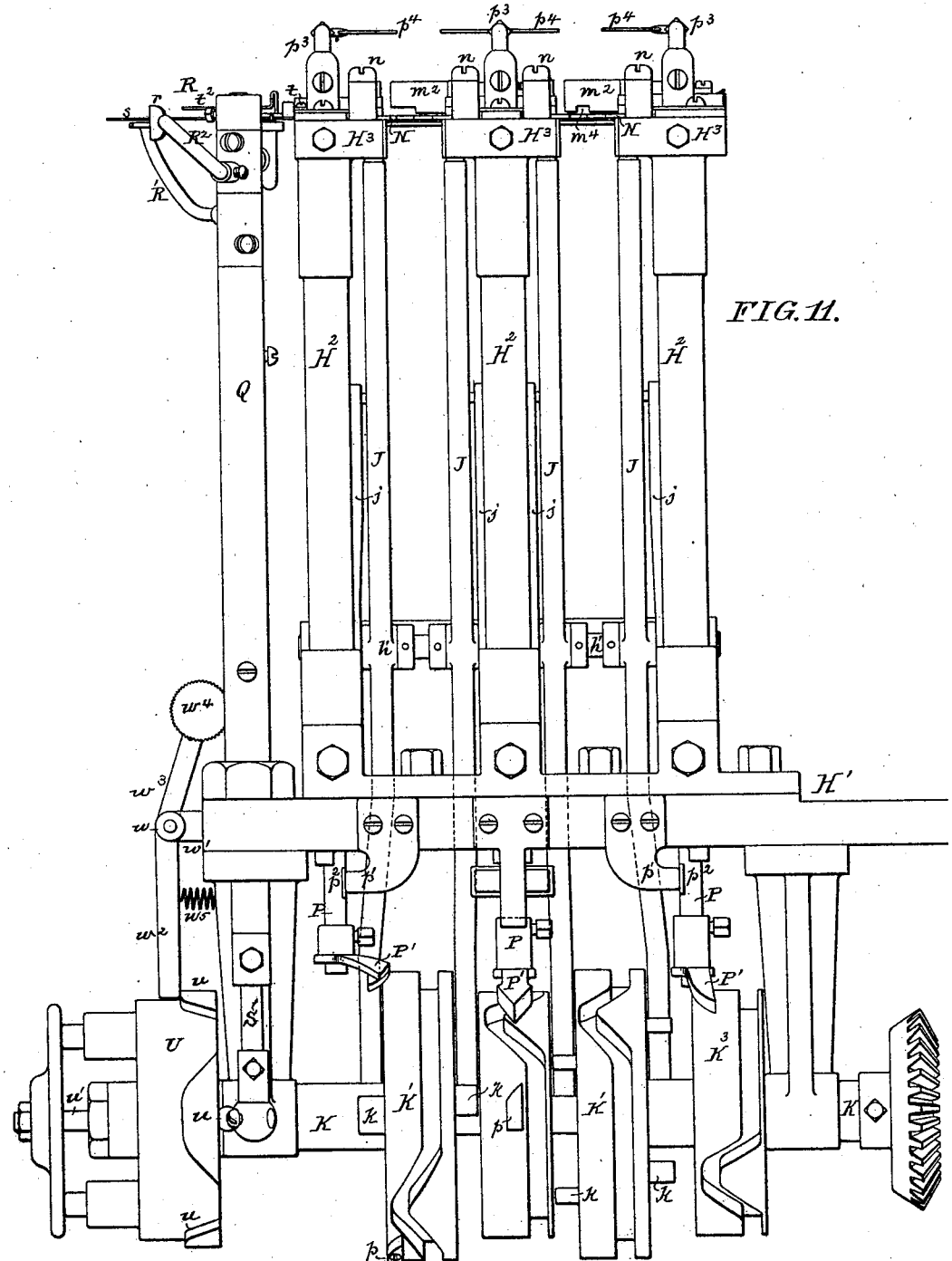
Figure 16:
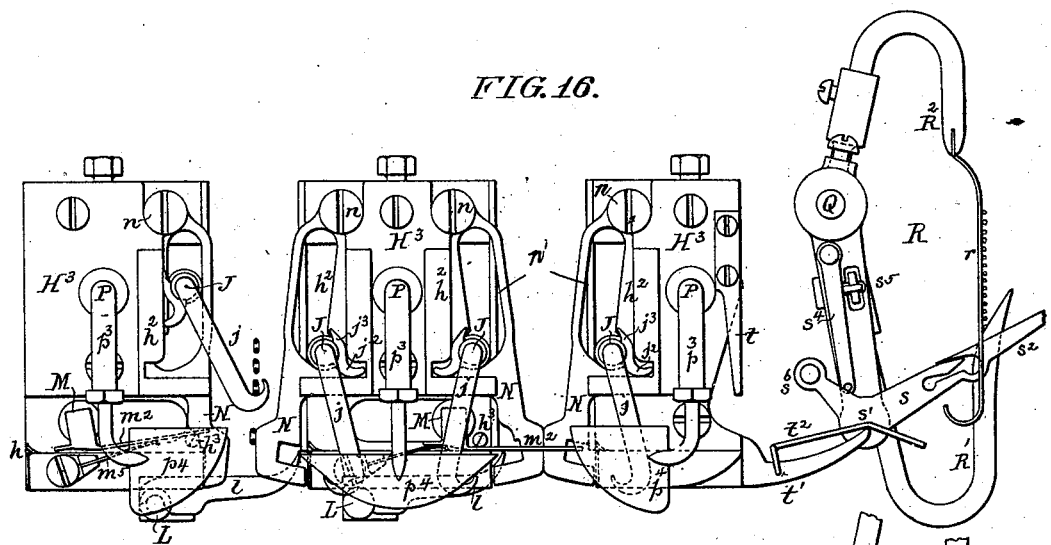
Figure 17:
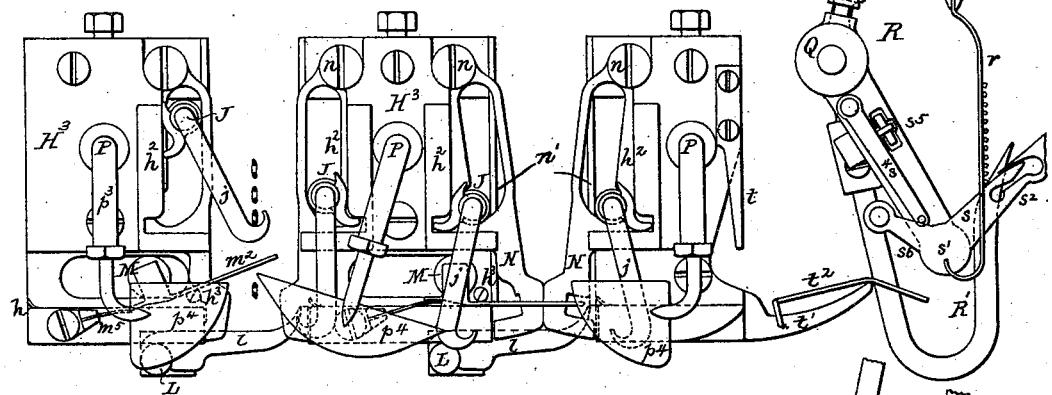
Figure 18:
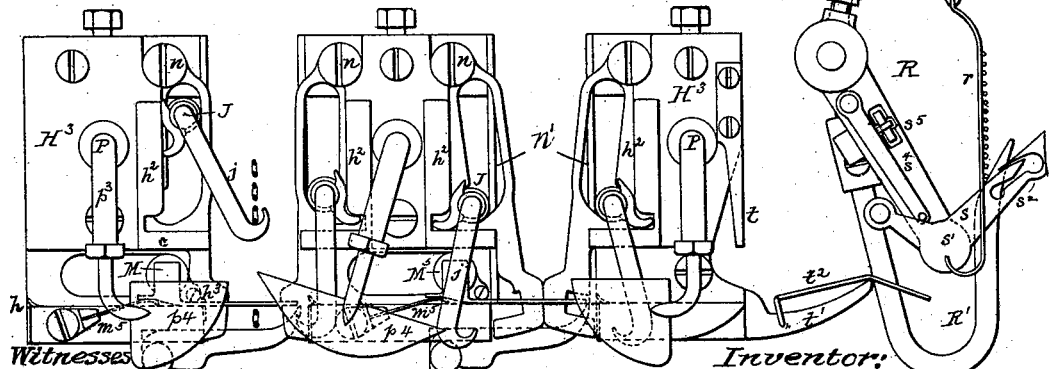

Figure 1 is a transverse sectional view of my improved warp-drawing machine. Fig. 2 is a longitudinal sectional view on the line 2 2, Fig. 1, with the selecting mechanism removed. Fig. 3 is a side view looking in the direction of the arrow 1, Fig. 2, omitting the parts in the distance. Fig. 4 is a side view looking in the direction of the arrow 2, Fig. 2, omitting the parts in the distance. Fig. 5 is a rear view showing the thread-carrier. Fig. 6 is a longitudinal sectional view of the thread-carrier comb. Fig. 7 is a transverse sectional view of the comb. Fig. 8 is a sectional view on the line 5 5, Fig. 4. Fig. 9 is an enlarged view, looking from the rear of the machine, of the thread and heddle-eye selecting devices detached. Fig. 10 is a side view looking in the direction of the arrow 10, Fig. 9. Fig. 11 is a view looking in the direction of the arrow 11, Fig. 9. Fig. 12 is a plan view of the heddle-eye and thread selecting mechanism. Fig. 13 is a plan view of the thread-selecting mechanism enlarged. Fig. 14 is a detached perspective view of one of the heddle-eye clamp-plates. Fig. 15 is a detached perspective view of one of the heddle-hooks. Figs. 16, 17, and 18 are diagram views showing the thread and heddle-eye selecting mechanism in the different positions.

I will first describe in general the operation of the machine.

Adapted to the bed of the machine is a carriage, which is fed across the machine by a screw. On this carriage is mounted the needle mechanism. This needle mechanism in the present instance consists of a flat needle and gearing driven from the driving-shaft of the machine, which will drive the needle out of its box through the dents of the reed, the selecting-eye of the heddle, and in position to receive a thread. On its return it will draw the thread through the selected eye, through the dent of the reed, and will then be disengaged from the thread.

The needle-carriage is fed across the machine at such a speed as to pass through the heddle-eyes and dents of the reed in succession.

Mounted on brackets projecting from the rear of the bed are standards supporting frames on which are hung the heddles. I have shown in the drawings two heddles, but it will be understood that the machine can be constructed for the reception of any number of heddles.

On the rear of the brackets are standards supporting a thread-carrying frame, the threads being so arranged that the thread-selector will select one thread at a time and place it in the path of the needle, so that it can be drawn through the heddle-eyes.

On a bracket projecting rearwardly from the carriage are mounted the heddle-eye-selecting devices and the thread-selector. The heddle-eye selectors are operated from the carriage through a series of cams, so that the first selected thread will pass through the eye of one heddle and the next thread will pass through the eye of the other heddle, and so on until all the eyes are threaded, each alternate thread being carried by one heddle and the other threads carried by the other heddle.

It will be seen that when the warp-threads are drawn from the beam and secured to the thread-carrying frame at the rear of the machine and the carriage fed from right to left the machine will select the threads in rotation and draw them through their respective heddle-eyes and through the dents of the reed without further handling by the operator.

I will now describe the details of the machine, taking up first the supporting mechanism for the warp-threads and for the heddles.

A is the bed of the machine, and projecting rearwardly from each side of the bed are brackets or extensions A'. On the outer ends of these extensions are standards A², and projecting from these standards are long studs $a$, Fig. 4, from which the thread-carrying frame B is suspended.

Mounted in bearings $b^2$, secured to the depending bars $b'$, is a driven friction-roll B', which is driven from the main shaft by mechanism described hereinafter. This roll B' is covered with felt or cloth and the ends of the warp-thread pass around it and are held by a pressure-roll B², having journals adapted to bearings $b^3$, pivoted to the roll B'. The roller B² is preferably geared to the roller B', Fig. 5.

The slotted bearings $b^3$ at each end of the machine are connected together by a bar $b^4$, and the bearings are provided with handles by which they can be turned to stretch the warp-threads.

The bearings can be held in their respective positions by a handled clamp-nut $b^5$ or other retainer. As shown in Fig. 8, the clamp-nut is adapted to a screw-threaded extension of the bearing $b^2$, so that on turning the nut it will rigidly confine the bearing $b^3$ against the bearing $b^2$.

Secured to the upper bar $b$ of the frame are two arms $b^6$, carrying a rod $b^7$, over which the warp-threads pass. The bar $b$ is pivoted in the heads $b^8$ so as to turn a limited distance, a pin $b^9$ on the bar working in a slot $b^{10}$ in the bearings, as shown in Fig. 5.

On the rod $b^7$ is a comb B³, which extends the full length of the rod and is of such mesh as to accommodate the threads of the warp, which pass up from the beam over the rod $b^7$, through the meshes of the comb, down to and around the driven friction-roll B', and between it and the pressure-roll B². As shown in Figs. 6 and 7, the teeth of the comb are adjustable to accommodate the warps.

The rod $b^7$ is made tubular, and within the rod is a spring $b^{11}$, secured at one end to the rod and at the other end to a slide $b^{12}$, which is secured in its adjusted position by a clamp-screw $b^{13}$, and between each coil of the spring is placed a loose tooth $b^{14}$, pointed, as shown. When the spring is drawn out, the distance between the teeth is increased and when the spring is compressed the space between the teeth is decreased.

In placing the warp in the machine the ends of the warp are confined by an ordinary warp-clamp, and after the threads are adjusted in the machine this clamp is either removed or the threads cut, so as to detach the clamp. Thus the threads are held solely by the rolls B' B², so that they will be free to be drawn by the needle through the heddle-eyes and reed.

The bearings $b^8$, carrying the bar $b$, are adapted to slide vertically on the depending bars $b'$, and journaled in lugs $b^{15}$ on these bearings is a shaft $c$, having chain-wheels $c'$ at each end, around which pass chains $c^2$, secured to lugs on the heads $b^{16}$ of the rods $b'$. These heads are mounted on the long studs $a$. By turning the shaft $c$ the bar $b$ can be adjusted toward and from the roll B'.

Pivoted to the bearing $b^2$, at the lower end of the depending bar $b'$, are locking-arms $c^3$, which are of such a length as to pass under the lugs $b^{15}$ of the bearing $b^8$, as shown in Fig. 1, when the bar $b$ is elevated.

In order to adjust the warp laterally in respect to the needle mechanism, I mount a shaft C in one of the brackets, and on the end of this shaft is a crank $c^4$, which is connected to one of the bearings $b^2$ of the frame B by a connecting-rod $c^5$. This shaft C has at the opposite end a handle C' within easy reach of the operator, as shown in Fig. 4, so that on moving the handle in one direction or the other the frame B can be moved laterally in respect to the thread-selecting mechanism. This handle has a screw-pin $c^6$, which engages with a segment $c^7$, mounted on the bracket A', so that the handle can be locked in any position desired.

Adapted to bearings in the bed A is a driving-shaft D of the machine, being connected to the pulley-shaft D' by gearing $d\,d'$, Fig. 3. Loose on the pulley-shaft is a belt-pulley which can be locked to the shaft by a friction-clutch D², connected to an arm on a handled shaft D⁴, as clearly shown in Fig. 1, so that on moving the handle $d^2$ in one direction the clutch will lock the pulley to the shaft D' and the machine will be set in motion. By reversing the handle the clutch will be released. The handle $d^2$ travels with the carriage H and is adapted to slide on but turn the shaft D⁴.

On the opposite end of the driving-shaft D is a worm $d^3$, meshing with a worm-wheel $d^4$ on a shaft D³, inclined in the present instance and adapted to bearings on the frame A'. On the outer end of this shaft is a bevel-wheel $d^5$, meshing with a bevel-wheel $d^6$ on the short shaft $d^7$, and on this shaft is a long pinion $d^8$, meshing with a gear-wheel $d^9$ on a journal of the roll B'. It will thus be seen that the roll is driven through the medium of the shaft D³ from the main driving-shaft of the machine, and, owing to the worm-gearing, the rotary motion of the roll is slow, but is sufficient to take up any slack in the warp-threads mounted in the frame B, and the frame can be moved laterally without disengaging the gears, as the pinion $d^8$ is of sufficient length to allow for the adjustment.

I will now describe the supports for the heddles.

As remarked in the first part of the specification, I have shown supports for two heddles only.

E are standards mounted on the brackets A', and screwed into the upper part of these standards are sockets $e$ for the cross-bars $e'$. On these cross-bars are adjustable hooks $e^2$, in which rest the upper bars $f$ of the heddles F. Adapted to guides in the lower part of each frame E are bars $e^3$, having hooks $e^4$, which project upward. The heads of these hooks extend over the lower bars $f'$ of the heddles, as clearly shown in Figs. 1 and 2.

Depending from each end of the upper bar $e'$ are toothed arms $e^5$, with which pawls $e^6$ on the lower bar $e^3$ engage, so that when the heddles are placed in position, as shown in Fig. 2, they can be stretched taut by simply drawing down upon the lower bar $e^3$, the pawls slipping past the teeth until the heddle is sufficiently stretched. When the heddles are to be removed, all that is necessary is to release the pawls.

Extending through the heddles above and below the eyes are cords, wires, or bars $E'$, secured at one end to springs and at the opposite end to a head $e^7$. This head in turn is secured to one arm of a lever $E^2$, which is pivoted at $e^8$, and each lever has an arm $e^9$, extending around the bracket $A'$, and on these arms are pins $e^{10}$, adapted to the grooves of the cams $d^{10}$ on the shaft $D^3$, so that a continuous motion is given to the bars $E'$. This arrangement is for the purpose of preventing the cords of the heddle from adhering one to another when being selected by the selecting mechanism.

I have not shown the reed-dent selector, nor have I shown the needle mechanism in detail, as the arrangement of this mechanism forms no part of my present invention.

Referring now to the thread-selecting and heddle-eye-selecting mechanisms, on a bracket $H'$, projecting from the rear of the carriage H, are mounted hollow posts $H^2$, carrying the heads $H^3$. These heads have guides $h$ for the needle $i$, which passes through each of the guides in the heads and into such position in relation to the thread-selecting hook that it will take the thread from the hook and draw it through the eyes of the heddles and through the reed. Pivoted at $h'$ on the bracket $H'$ are a series of levers J. These levers are acted upon by pins $k$ on the cams $K'$, which are mounted on the shaft K, driven from the shaft on the carriage through the inclined shaft $K^2$. A spring $j'$ tends to force the upper arms of the levers toward the needle-guide $h$, while the pins on the cams retract them. Swiveled in the upper end of each lever J is a selecting-hook $j$, (shown clearly in Fig. 15,) and on the shaft of this selecting-hook are fingers $j^2$ $j^3$. The selecting-hook travels in ways $h^2$ on the head $H^3$, and these ways have notches at the end nearest the needle-guide $h$, so that when the selecting-hooks are in the forward position, as shown in Fig. 12, the fingers $j^2$ rest in the notch, but as soon as the pins on the cams move the selecting-hooks back from the needle-guides one of the hooks is moved toward the heddle, as shown in Fig. 16, drawing the remaining eyes away from the selected eye, so that the other mechanism can work with freedom and insure the proper adjustment of the selected eye in respect to the needle. The hooks are so operated that only one set will be actuated at one time, and these one in advance of the other, so that the heddle-eye on one side will be selected from the remaining eyes and the remaining eyes held back by both sets of hooks.

L are levers, each having fingers $l$, which prevent the heddle-eye from moving past the line of the needle. The levers L are operated by the cams $K'$ and have pins $l'$, which enter the cam-slots in the periphery of the cams. The fingers $l$ are hooked, as shown, and the levers simply have a movement across the openings for the heddles.

M are two levers pivoted at $m$ and controlled by the cams $K^3$ and have pins $m'$, adapted to grooves in the cam. On the upper end of each lever are loosely pivoted clamp-plates $m^2$, Fig. 14, which not only have a movement across the opening for the heddles, but have a clamping action, so as to clamp the eye against the finger $l$.

On the head $H^3$ is a fixed pin $h^3$, and in the plate $m^2$ are two slots $m^3$ and $m^4$, and on the head is a spring $m^5$, so situated in relation to the plate that it will act to force the plate away from the eye until the lever M has passed the end of the spring. Then it will act on the portion of the plate beyond the pivot and will tend to force the plate toward the eye, and when the notch $m^3$ is opposite the pin $h^2$ the plate will be released from the control of the pin and will press upon the eye and will be held by the pin, and as the plate $m^2$ moves back its pivot passes the end of the spring, when the pressure will be reversed, tending to force the plate away from the eye, the plate being held, however, until the notch $m^4$ is opposite the pin $h^2$, when the plate will spring back to its first position. The object of this arrangement is to allow the plate to select the eye and draw it over and confine it in position in the line of the needle.

N N are two clamps for clamping the eye in the direction of the movement of the needle, so that when the eye is held by the clamps N N and the plate and finger it cannot possibly move out of the path of the needle. The clamps N N are pivoted at $n$ to each head $H^3$ and have cam-slots $n'$, through which pass the ends of the levers J, so that the clamps are opened and closed on the movement of these levers.

Passing through the posts $H^2$ are rods P, having at their lower ends arms $P'$, with which engage cam-lugs $p$ on the cams $K^3$ and $K'$. Springs $p'$, acting on plates $p^2$ on the rods P, tend to return the rods to their normal position as soon as acted upon by the lugs $p$. On the ends of these rods a short distance above the heads $H^3$ are arms $p^3$, having separating-blades $p^4$, of the shape shown in Figs. 12 and 16, and these blades separate the selected eye from the remaining eyes held back by the hooks and are used as an additional safeguard, so that in the event of the cords of the eyes adhering these blades will enter the space between the cords and force them apart.

The parts are so timed that when two heddles are being threaded the eyes of one heddle are held back until an eye in the other heddle is selected, clamped, and threaded.

As shown in Fig. 16, an eye in the first heddle is being released and will come between the jaws N N, but will be prevented from moving farther by the finger $l$, the other eyes being held back by the hooked arm $j$.

In Fig. 17 the clamp-plate $m^2$ is moving forward outside of the pin against the pressure of its spring, so as to pass back of the eye to be threaded. The central plate $p^4$ is also moved forward, so as to separate the cords of the heddles in the event of their adhering. In the meantime the notch $m^3$ of the clamp-plate has come opposite the pin $h^3$ and allowed the clamp-plate to assume the position shown in Fig. 18, after which the jaws N N come together, as shown in Fig. 12, holding the eye for the needle to pass through it, the eye that was previously clamped by the other jaws being in the meantime released and moved out of the way, so that the needle will only pass through the selected eye.

Mounted on the standard Q at the extreme end of the bracket H' is a thread-selecting head R. (Shown in plan view, Figs. 12 and 13.) On this head are two arms R' R², each in the form of a hook and so arranged that their ends pass each other. The arm R² has a spring-tongue $r$, against which the warp-threads confined to the frame B rest, so that they may be selected by the selecting-hook in rotation.

The end of the arm R' projects at an angle beyond the spring-tongue $r$, forming a V-notch, into which the thread to be selected can pass, so that when the selecting-hook is moved in contact with the thread to be selected the thread cannot be displaced, but will be selected by the hook.

S' is a shaft adapted to bearings in the standard Q and actuated by the cam-shell U. Pivoted to an arm S on the shaft S' is a selecting-hook $s$, pivoted at $s'$. This selecting-hook is shaped as clearly shown in Fig. 13, and has a long prong $s^2$, which when it is moved presses against the thread to be selected, Fig. 16, moving forward until the hook portion $s^3$ is passed, Fig. 17, and on its return movement the thread will enter the slot formed by the hook and be carried by it away from the other threads toward the needle, Fig. 12. A very light pressure is exerted against the thread to be selected through the medium of a pivoted arm $s^4$ and a weighted lever $s^5$. The arm $s^4$ rests against the short arm $s^6$ of the selecting-hook, and this pressure is sufficient for the hook to engage one thread only, the space of the hook not allowing more than one thread at a time to be engaged. A spring may be substituted for the lever $s^5$, if desired.

When the hook is retracted, as shown in Fig. 13, it strikes a stop $t$ on the head H³, and on the further movement of the arm S it will throw the hook out in the direction of the arrow, Fig. 13, and its thread against the arms $t'$ $t^2$ and in the path of the hooked needle $i$, and the parts are so timed in the present instance that the thread is drawn over by the hook against the needle itself when it is projected, so that on its return the thread will pass into the hook of the needle and be drawn away from the supporting-frame and selecting-hook and through the selected eye of the heddle and dent of the reed. By this means I am enabled to select a single thread at each stroke. It will be understood that different-sized threads, but this can be readily accomplished, as the selectors can be readily removed from the arm.

$w$ is a bearing on the end of the bracket H', and in this bearing is a shaft $w'$, having an arm $w^2$, acted on by cams $u$ on a shell U; also secured to the shaft is an arm $w^3$, having a corrugated roller $w^4$, which is adapted to come in contact with the warp-threads on the frame B. A spring $w^5$ tends to force the roller against the threads and the cams $u$ draw the roller away from the threads during certain intervals, so that the carriage, as it is moved laterally, will not drag upon the warp-threads. The idea of the roller is to place an extra amount of friction on the threads as they are drawn by the needle. This roller may be dispensed with in some instances without departing from my invention.

The shell U is part of a clutch operated by a rod $u'$ from a point within easy reach of the operator to throw the thread-selecting mechanism into and out of gear. This is fully shown and described in my Patent No. 500,966, dated July 4, 1893.

I claim as my invention—

1. The combination in a warp-drawing machine, of a needle for drawing the warp, heddle-selecting mechanism, warp-thread-selecting mechanism, heddle-supports, a frame for the warp-threads consisting of the upper bar, comb thereon, and a roll around which the warp-threads pass, said roll being driven so as to keep the threads taut, substantially as described.

2. The combination in a warp-drawing machine, of a needle for drawing the warp, heddle-selecting mechanism, warp-thread-selecting mechanism, heddle-supports, a frame for the warp-threads consisting of the upper comb-bar and a roll around which the warp-threads pass, said roll being driven so as to keep the threads taut, with means for adjusting the upper bar in respect to the roll, substantially as described.

3. The combination in a warp-drawing machine, of needle mechanism, heddle-supports, thread and heddle-eye selecting mechanism, standards, studs on said standards, a frame B hung from said studs and supporting the warp-threads and mechanism for laterally moving the frame, substantially as described.

4. The combination in a warp-drawing machine, needle mechanism, heddle-eye-selecting mechanism, heddle-supports, thread-selecting mechanism, a comb for separating the threads and means for holding the loose ends of the threads, substantially as described.

5. The combination in a warp-drawing machine, needle mechanism, heddle-eye-selecting mechanism, heddle-supports, thread-selecting mechanism, a comb-bar for separating the warp-threads to be selected, the teeth of said bar being adjustable so that the spaces between the teeth can be increased or diminished, substantially as described.

6. The combination in a warp-drawing machine, needle mechanism, heddle-eye-selecting mechanism, heddle-supports, thread-selecting mechanism, a comb-bar, independent teeth forming the comb, a coiled spring within the bar, the teeth being adapted to the coils of the spring, said spring being secured to the bar at one end and to a slide at the opposite end and means for securing the slide in the adjusted position, substantially as described.

7. The combination in a warp-drawing machine, of the needle mechanism, heddle-eye-selecting mechanism, heddle-supports, thread-selecting mechanism, standards at the rear of the machine, pivots on said standard, a bar B hung from said pivots, clamps carried by the lower portion of the frame adapted to clamp the loose ends of the warp-threads to be selected, a comb-bar on the upper bars of the frame and means for adjusting the comb-bar in respect to the clamps, substantially as described.

8. The combination of the needle mechanism, heddle-eye-selecting mechanism, heddle-supports, thread-selecting mechanism, standards at the rear of the machine, bars suspended from said standards, a clamp for the loose ends of the warp-threads mounted on said bars, sliding bearings adapted to the bars, a cross-bar mounted on said bearings over which the warps pass, a shaft mounted on the sliding bearings, chain-wheels on said shaft, chains connected to the wheels and to the suspended bars and means for locking the bearings in the adjusted position, substantially as described.

9. The combination of needle mechanism, heddle-eye-selecting mechanism, heddle-supports, thread-selecting mechanism, the upper bar over which the warp-threads pass, a driven friction-roll and a pressing-roll adapted to confine the threads to the driven friction-roll and slotted bearings for said presser-roll, substantially as described.

10. The combination of needle mechanism, heddle-eye-selecting mechanism, heddle-supports, thread-selecting mechanism, the upper bar over which the warp-threads pass, a driven friction-roll and a pressing-roll geared to the driven friction-roll adapted to confine the threads to the driven friction-roll and slotted bearings for said presser-roll, substantially as described.

11. The combination of needle mechanism, heddle-eye-selecting mechanism, thread-selecting mechanism, an upper cross-bar $b$, a toothed cross-bar $b^7$ on said bar $b$, a roll B', a presser-roll $B^2$, mechanism for driving the said roll B' so that the thread is kept taut between the bar $b^7$ and the roll, substantially as described.

12. The combination in a warp-drawing machine, of needle mechanism, warp-frame, standards, upper and lower bars between which the heddle is stretched, arms depending from each side of the upper bar, teeth on said arms, with pawls on the lower bar engaging with said teeth, substantially as described.

13. The combination of needle mechanism, frames for holding the warps, heddle-eye-selecting mechanism and warp-selecting mechanism, standards on each side of the machine, upper and lower cross-bars in said standards, hooks on the upper cross-bars to receive the upper bar of the heddle and hooks on the lower bar to engage the lower bar of the heddle and toothed arms on one cross-bar and pawls on the other cross-bar engaging the teeth of the arms, substantially as described.

14. The combination in a warp-drawing machine, of needle mechanism, warp-supports, heddle-supports, heddle-eye-selecting mechanism and warp-thread-selecting mechanism, a cord or bar running through the heddle and means for reciprocating said cord or bar during the operation of the machine so as to separate the cords of the heddle, substantially as described.

15. The combination of needle mechanism, heddle-supports, warp-frame, heddle-eye-selecting mechanism, warp-thread-selecting mechanism, two cords or bars extending from one side to the other through the heddle, one cord or bar being above the eyes and the other cord or bar being below the eyes, a head connecting the two bars together, a lever connected to said head said lever having an arm, a shaft, a cam on said shaft engaging with said arm so as to reciprocate the cords or bars, substantially as described.

16. The combination in needle mechanism, heddle-supports, warp-frame, heddle-eye-selecting mechanism, warp-thread-selecting mechanism, with cords or bars extending through the heddles attached to one of the side frames of the machine through the medium of a spring and attached at the other end to the lever, and means for operating said lever so as to move the cords or bars within the heddles, substantially as described.

17. The combination in a warp-drawing machine, of the bed, the main shaft therein, the shaft $D^3$ extending toward the rear of the machine, heddle-supports, cords or bars E' extending through the heddles, levers $E^2$ pivoted to the standards and connected to the cords or bars, with cams on the shaft $D^3$ with which the levers $E^2$ engage so that as the shaft revolves reciprocating motion will be imparted to the bars, substantially as described.

18. The combination in a warp-drawing machine, of the bed, a carriage on which the needle mechanism, thread-selecting and heddle-eye-selecting mechanism are mounted; a driving-shaft D, a pulley-shaft D', geared to the driving-shaft, a loose pulley on said shaft D', a friction-clutch adapted to lock the pulley to the shaft, a lever on said friction-clutch, a shaft $D^4$ mounted on the bed, a handle adapted to travel with the carriage and slide upon the said shaft, an arm on said shaft connected to the arm of the friction-clutch so that the operator can throw the clutch into and out of engagement and thus start and stop the machine, substantially as described.

19. The combination in a warp-drawing machine, of selecting-hooks for the heddle-eyes mounted on each side of the heddle, and acting alternately, clamp-plates N N, for holding the eyes rigid in the direction of the travel of the needle, stop-arm $l$ for limiting the movement of the selecting-eye, and a clamp-plate $n^2$ having openings $m^3$ and $m^4$, a pin $h^3$ on the head, a spring acting on said clamp-plate and a lever upon which the clamp-plate is mounted, with mechanism for operating the said parts, the whole combined and operated substantially as described.

20. The combination in a warp-drawing machine, of selecting-hooks for the heddles, and clamps for locking the heddle-eye in position, a post for supporting the heddle-selecting mechanism, a shaft passing through the post and having an arm on its lower end, a cam acting upon said arm, said shaft having an arm at its upper end above the selecting mechanism, a plate on the arm adapted to act in conjunction with the selecting-hooks to separate the selected eye from the mass, substantially as described.

21. The combination in a warp-drawing machine, of the needle mechanism, heddle-supports, heddle-eye-selecting mechanism, a frame for holding the warp-threads, a vertical shaft S', an arm S secured to the upper end of said shaft, means for turning the shaft, a selecting-hook pivoted to the arm S, and an arm $s^4$ also pivoted to the arm S and resting against the selecting-hook, a weighted lever hung to the arm S and pressing against the arm $s^4$ so that sufficient pressure is given to the selecting-hook to engage with a single thread, substantially as described.

22. The combination in a warp-drawing machine, of the hooked needle, the warp-thread supports, the two arms R' and $R^2$, the arm R' being flared at its outer end and acting as an abutment for the thread to be selected, the arm R' having a spring-section against which the threads rest, a pivoted arm, means for reciprocating the arm, a selecting-hook pivoted to said arm, a weighted lever acting to force the hook against the thread to be selected, a stop to move the hook with the thread into the path of the hooked needle, substantially as described.

23. The combination in a warp-drawing machine, of the frame for the warp-threads, the carriage, the thread-selecting mechanism, the heddle-selecting mechanism and the needle mechanism, a pressure-roller pivoted to the carriage, cams acting on said pressure-roller so that the roller will rest against the warp-threads during the drawing of the threads by the needle mechanism, substantially as described.

24. The combination in a warp-drawing machine, of the needle mechanism, the heddle-selecting mechanism, warp-thread selectors of the upper support for the warp-threads, with two driven friction-rollers adapted to engage the loose ends of the warp-threads and hold the said threads taut, with a pressure-roller adapted to travel with the selecting mechanism and rest against one of the said friction-rollers while the needle mechanism is drawing the thread, substantially as described.

In testimony whereof I have signed my name to this specification in the presence of two subscribing witnesses.

LEWIS P. SHERMAN.

Witnesses:
HAMILTON D. TURNER,
JESSE GOULD.